United States Patent [19]

Stone

[11] Patent Number: 4,591,171
[45] Date of Patent: May 27, 1986

[54] SEAL FOR AIR CHARGING A CHUCK

[75] Inventor: William Stone, East Jordan, Mich.

[73] Assignee: Sheffer Collet Company, Traverse City, Mich.

[21] Appl. No.: 585,367

[22] Filed: Mar. 2, 1984

[51] Int. Cl.$^4$ .............................................. B23B 31/30
[52] U.S. Cl. ......................................... 279/4; 92/106; 279/2 A
[58] Field of Search ...................... 279/1 D, 2 A, 3, 4; 277/3, 27; 92/106

[56] References Cited

U.S. PATENT DOCUMENTS

| | | | |
|---|---|---|---|
| 1,925,109 | 9/1933 | Olson | 279/4 |
| 2,993,473 | 7/1961 | Hohwart et al. | 279/1 D |
| 3,169,777 | 2/1965 | Cull | 279/4 |
| 3,685,844 | 8/1972 | Sykes | 279/4 |
| 3,918,352 | 11/1975 | Reich et al. | 92/106 |
| 4,253,694 | 3/1981 | Walter et al. | 279/2 A X |
| 4,434,990 | 3/1984 | Kobayashi | 279/4 |
| 4,537,410 | 8/1985 | Hiestand | 279/4 |

FOREIGN PATENT DOCUMENTS

| | | | |
|---|---|---|---|
| 2119468 | 4/1971 | Fed. Rep. of Germany | 279/4 |
| 2434859 | 2/1975 | Fed. Rep. of Germany | 279/4 |
| 0056712 | 4/1983 | Japan | 279/4 |

*Primary Examiner*—Z. R. Bilinsky
*Assistant Examiner*—Glenn L. Webb
*Attorney, Agent, or Firm*—Price, Heneveld, Huizenga & Cooper

[57] ABSTRACT

Means are provided to introduce pressurized fluid from a source into an intermittently rotated machine tool such as a chuck while the tool is stationary. The means includes a stationary annular shell surrounding a portion of the tool and radially spaced a short distance from the surface of the tool. The inside of the shell has a channel which seats an annular flexible U-shaped seal the radially outer ends of the legs of which are rigidly secured to the shell. The inner face of the seal is a web having a relatively stiff center band which, under fluid pressure is forced to shift into contact with the surface of the tool to form a seal on each side of a groove in the tool's surface. A restricted opening permits fluid from the inside of the seal to be introduced into the groove to supply the tool.

2 Claims, 7 Drawing Figures

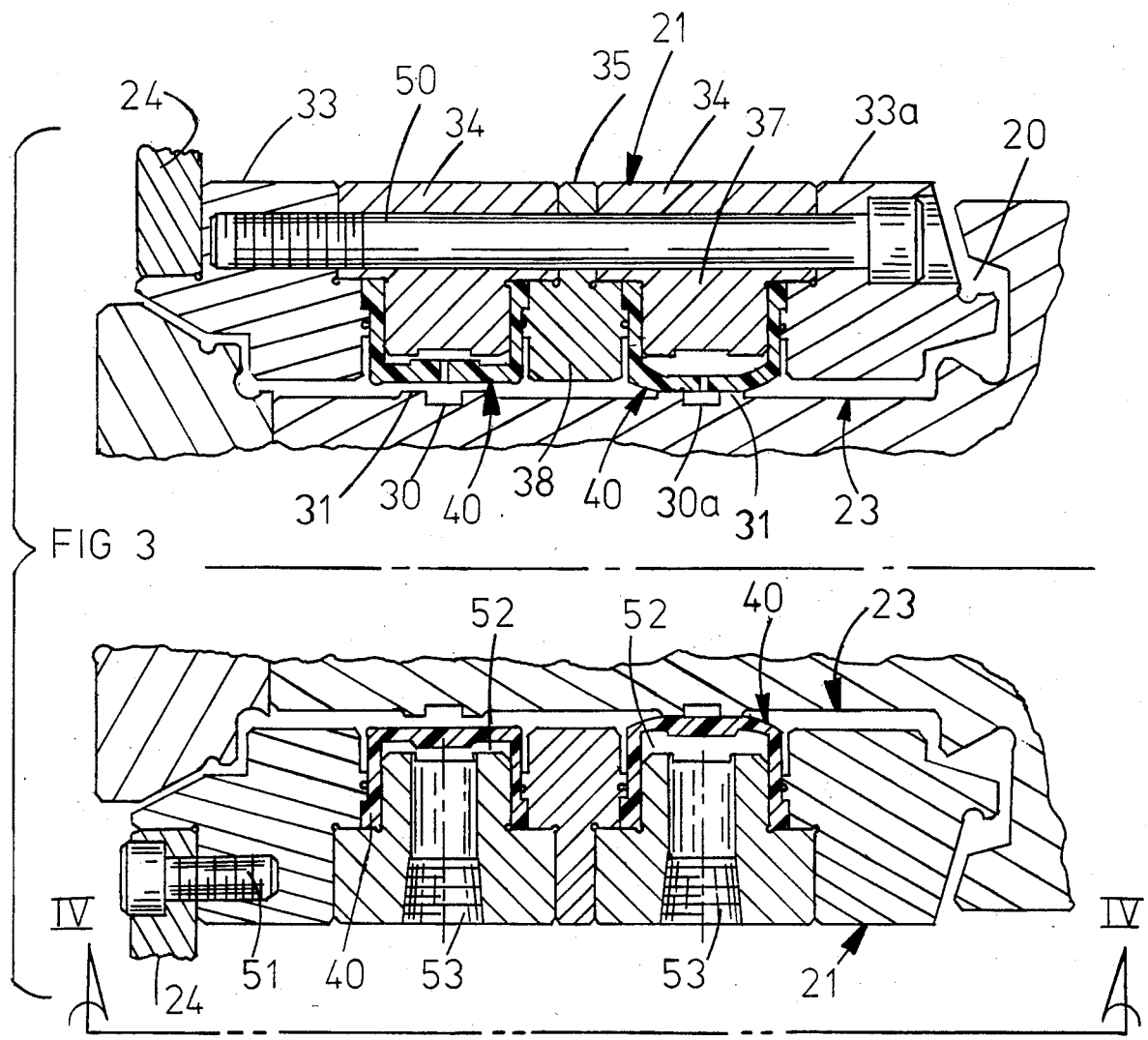
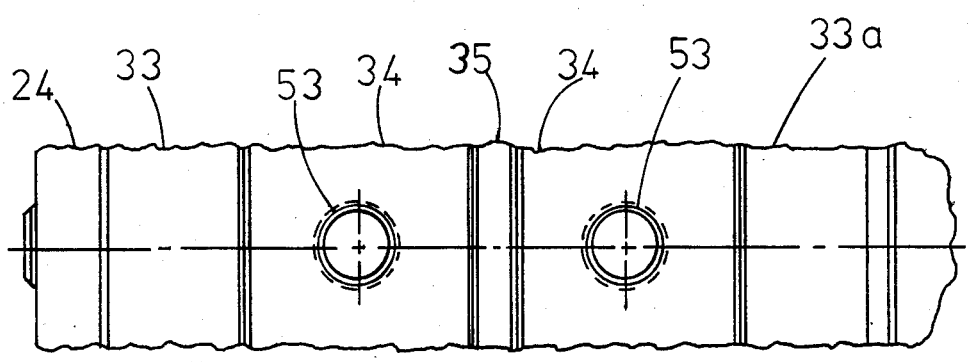
FIG 3
FIG 4

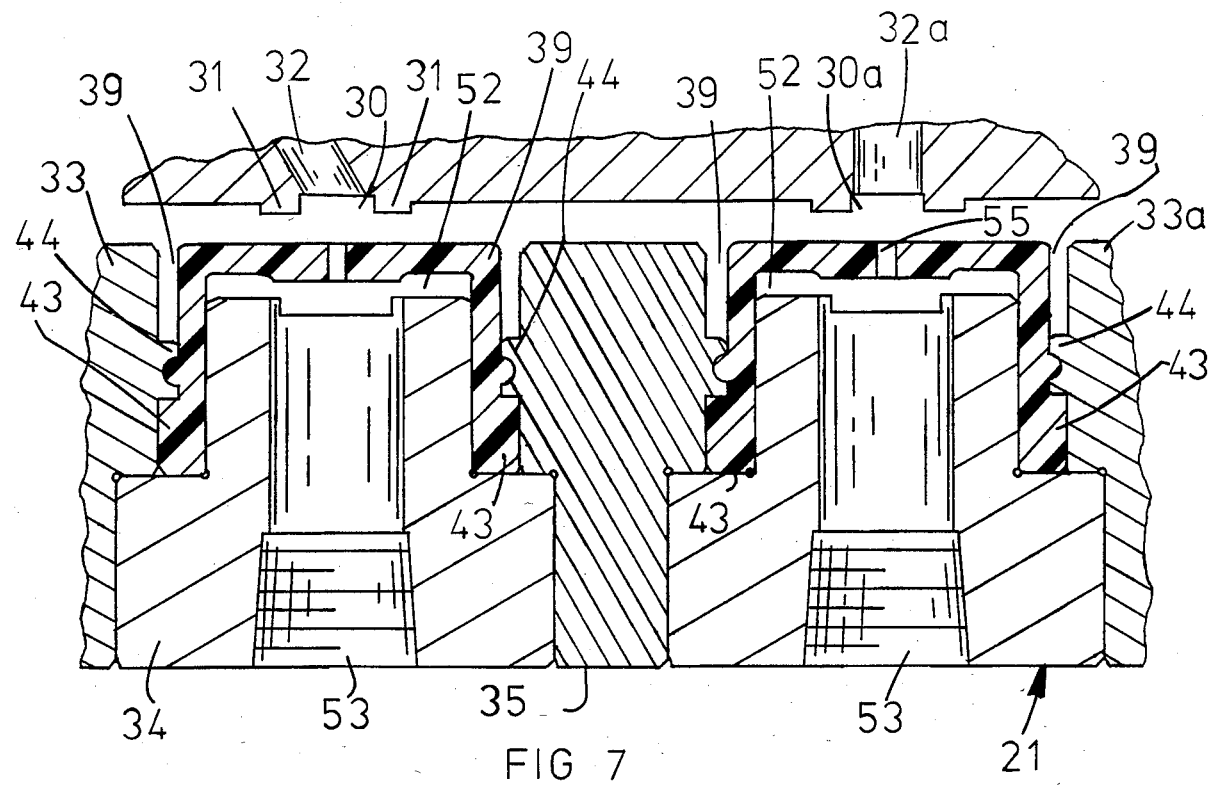
FIG 7
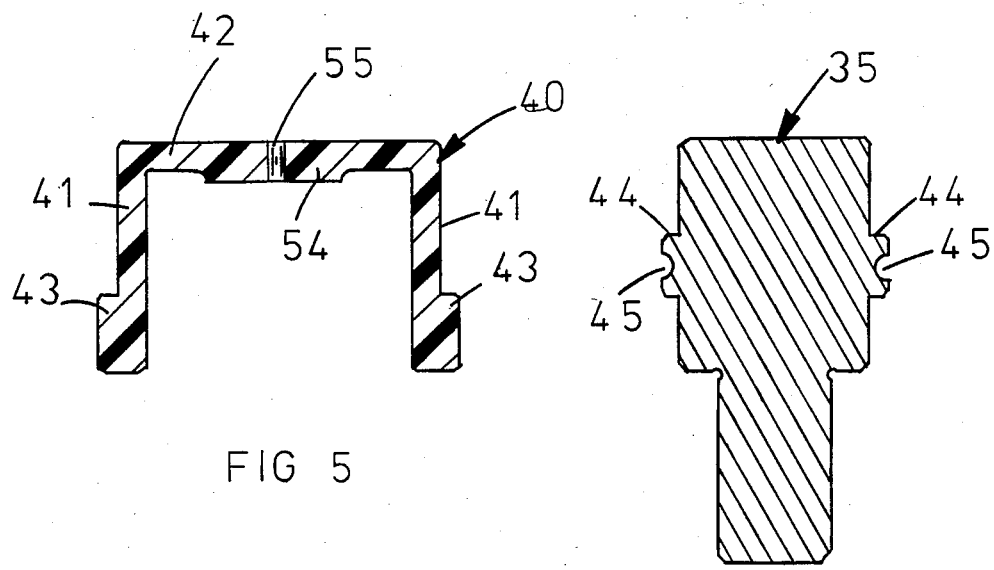
FIG 5
FIG 6

SEAL FOR AIR CHARGING A CHUCK

FIELD OF THE INVENTION

This invention relates to machine tools and more particularly to a means by which a fluid, such as air, under pressure can be introduced to a rotatable element such as the chuck for a machine tool while the element is stationary. More particularly, it relates to a construction which permits the air supply to be locked to the element while the element is stationary and to automatically retract from the element to completely disengage it while the element is rotating.

BACKGROUND OF THE INVENTION

A number of rotatable elements, particularly in the field of machine tools have within them various movable components which are actuated by fluid under pressure such as compressed air. An example of such a machine tool is a chuck having air actuated jaws for clamping the workpiece. Such tools require a source of air under pressure while the tool is stationary with the air source being disconnected from the tool during tool rotation. A number of devices have been developed to provide fluid delivery means to a temporarily stationary tool such as a chuck. Once the mechanism within the tool has been fully actuated, suitable check valve means seals the fluid within the tool and the air source is disconnected. However, heretofore there has been no effective means which automatically and positively disengages the fluid source and tool during tool rotation. This has caused a number of problems particularly rapid wear of the seal which must be provided while the tool is being charged. The excessive wear results from frictional engagement, even though it may be slight, between the seal and the tool when the tool is being rotated. Even slight contact results in rapid and excessive wear. This invention overcomes these problems by providing means which effects a positive seal with the tool during fluid delivery and positive release during tool rotation.

BRIEF DESCRIPTION OF THE INVENTION

The invention utilizes a ring-like or annular housing surrounding and concentric with the exterior surface of the tool to be charged with fluid. This housing has a radially inwardly opening channel within which is seated an annular diaphragm or seal member of U-shaped configuration having a web closing the open face of the channel. The seal forms a chamber within the channel into which fluid under pressure can be introduced. The ends of the sides of the seal are securely fixed to the housing whereby, as the pressure of the fluid introduced into the chamber increases, only the web and an adjacent small portion of the sides of the seal can flex. In normal retracted position the web is positioned substantially flush with the inner surface of the ring providing a positive clearance between it and the surface of the tool. As the fluid pressure in the chamber increases, the web is forced to flex radially inwardly and seat against the surface of the tool, forming a seal on each side of a radially outwardly opening channel in the surface of the tool. The web has one or more openings in it to pass fluid from the chamber into the recess in the tool but the collective fluid flow capacity of these openings in less than the capacity of the opening through which the fluid is introduced in the chamber thereby pressurizing the chamber. This assures a positive engagement and seal with the tool. Once the tool has been charged, the pressurized air source is terminated and the web retracts, totally disengaging from the tool. This permits the tool to be rotated without damage to the web or drag imposed on the tool.

BRIEF DESCRIPTION OF THE DRAWINGS

FIG. 3 is an enlarged fragmentary, sectional view of the means of this invention by which fluid is introduced to the chuck;

FIG. 4 is a fragmentary, sectional view taken along the plane IV—IV of FIG. 3;

FIG. 5 is an enlarged sectional view of one of the seals utilized in this invention;

FIG. 6 is an enlarged sectional view of the center ring or spline of the annular housing mounting the seals; and FIG. 7 is an enlarged fragmentary, sectional view of the manner in which the seals are mounted and the fluid introduced behind the seals.

DESCRIPTION OF THE PREFERRED EMBODIMENT

In the following description, the invention will be described and illustrated as applied to a chuck for a machine tool. This application of the invention is to be considered as illustrative only since the invention can be applied to any intermittently rotated tool having a circular component equipped with a fluid operated internal mechanism which must be charged while the tool is stationary.

Figure 1:
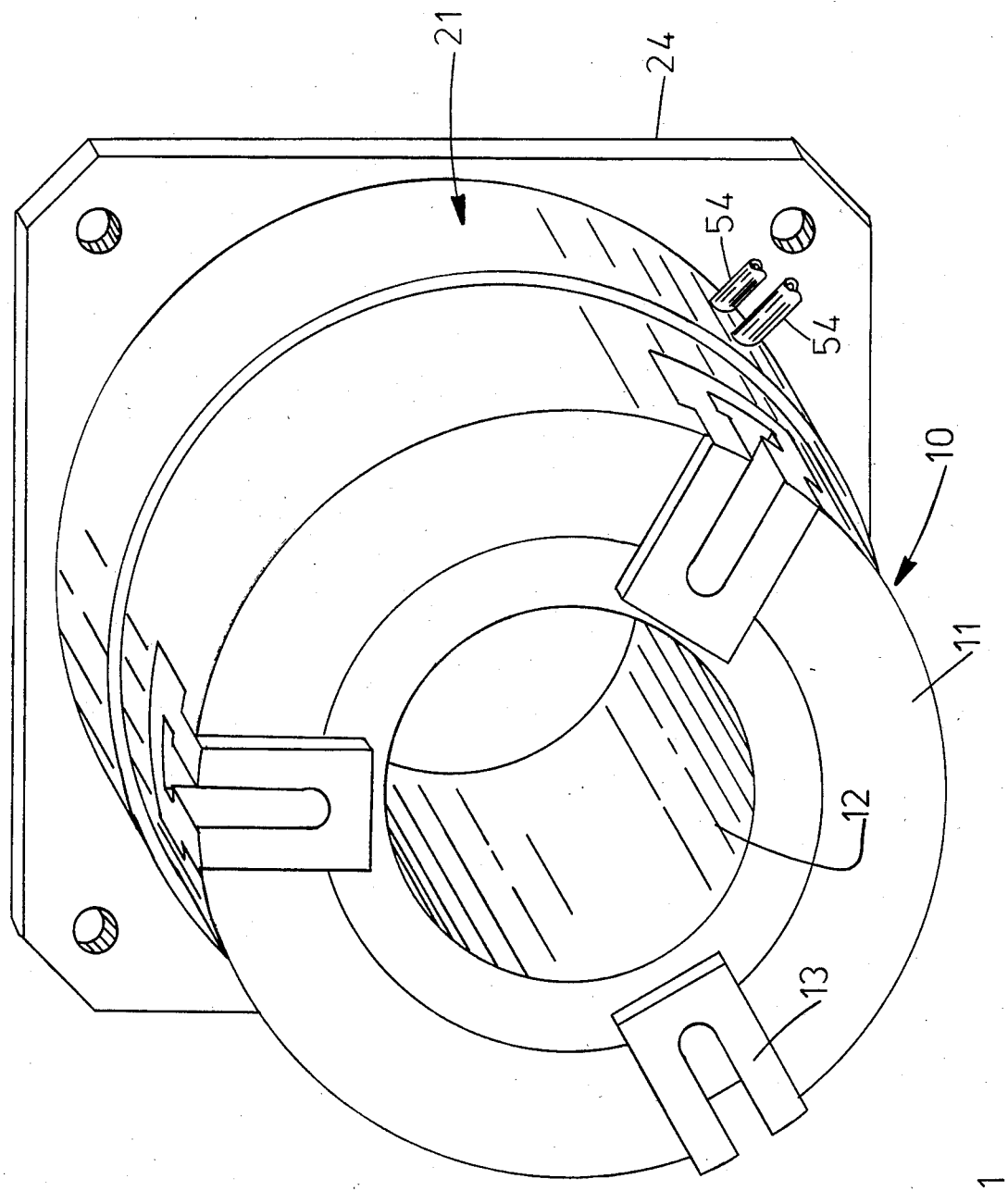
FIG. 1 is a perspective view of a chuck equipped with this invention.
Figure 2:
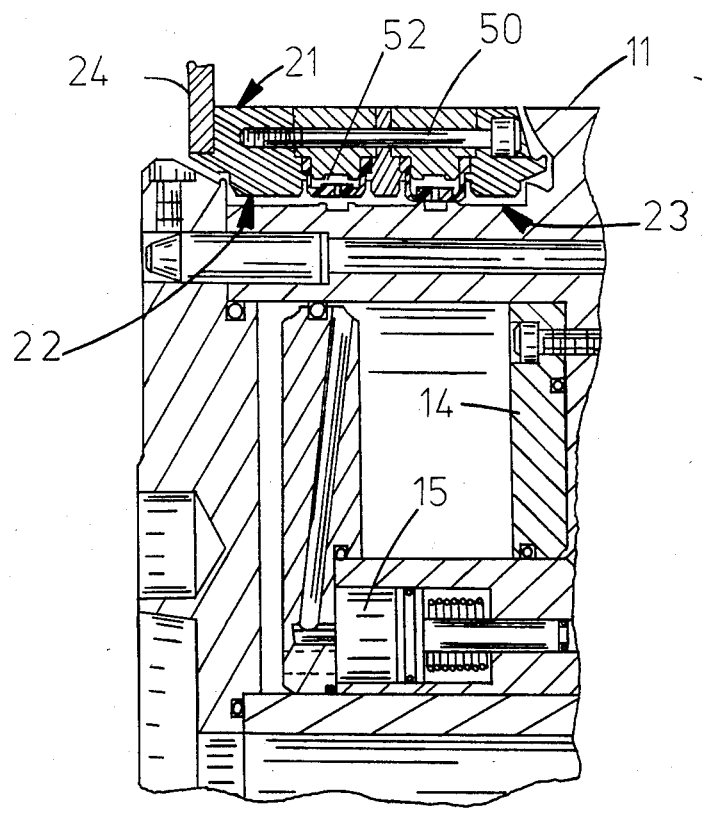
FIG. 2 is a fragmentary, sectional elevation view of the rear portion of the chuck illustrated in FIG. 1.
Figure 2:
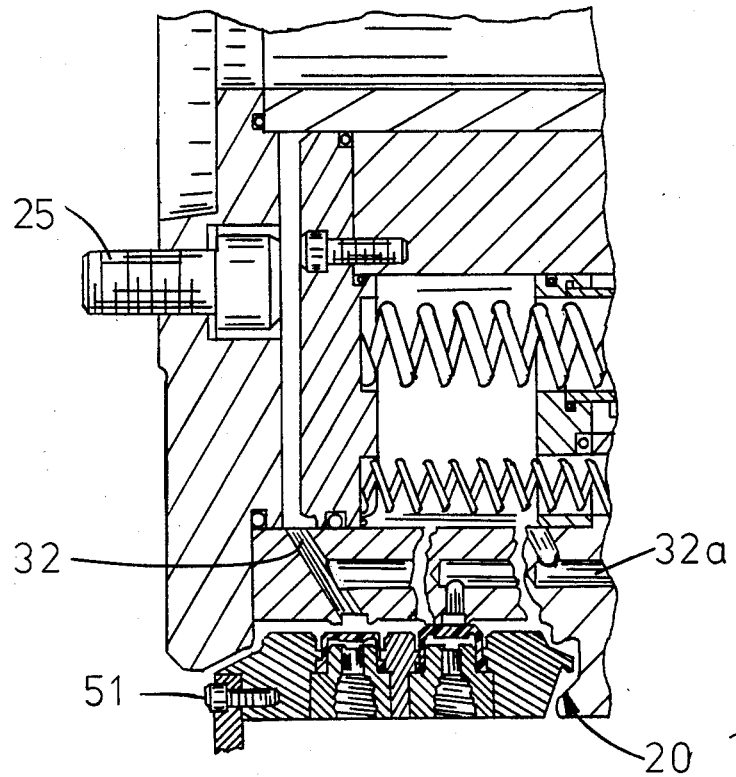

Referring to FIG. 1, the numeral 10 illustrates a chuck having a main body portion 11 designed to be mounted for rotation on a suitable machine tool. The chuck is illustrated as having a central opening 12 to receive a workpiece which is clamped by means of the jaws 13. As illustrated in FIG. 2, within the chuck are fluid actuated elements 14 and 15 which open and close the jaws 13 in response to pressurized fluid introduced into the chuck. None of the mechanisms within the chuck for actually moving the jaws or locking them in either open or closed position is a part of this invention. Such a mechanism is illustrated and described in co-pending patent application, Ser. No. 418,729, filed Sept. 16, 1982, entitled "Through Hole Chuck", assigned to the assignee common to this application.

The rear portion of the body 11 of the chuck is recessed to provide a circumferential channel 20 in the chuck body which opens through the outer surface of the rear portion of the chuck body. This recess need not necessarily be at the rear of the chuck, although this is a particular convenient location for it. Received within this recess is an annular shell or housing 21. The shell 21 is concentric with the chuck body 11 with its inner surface 22 spaced radially outwardly from the outer surface of the chuck body forming the body 23 of the recess 20. Preferably, this clearance is between 0.0625 to 0.125 of an inch. The shell 21 is supported by suitable means such as a plate 24 which is bolted or otherwise secured to a rigid, stationary support (not illustrated). Thus, the shell 21 is held stationary at all times while the chuck is mounted for rotation within it. How the chuck is secured is not relevant to this invention but, for example, it can be bolted to a suitable drive by means such as the cap screw 25 (FIG. 2).

As more clearly illustrated in FIGS. 3 and 7, a pair of channel-like grooves 30 and 30a are provided in the base or bottom 23 of the recess 20. While the grooves 30 could be recessed into the surface 23, in the particular construction illustrated, the grooves are formed by a pair of ridges 31 which project radially outwardly a short distance, one on each side of each groove. The grooves 30 and 30a, by passages 32 and 32a (FIGS. 2 and 7) communicate with the interior fluid operated elements 14 and 15 and any other fluid operated mechanism within the chuck.

The annular shell or housing 21 is assembled from a number of annular components. Included in these components are a pair of annular side members 33 and 33a. Adjacent each of the side members is an annular body member 34 of generally T-shape cross section. At the center of the shell 21 and seated between the two body members 34 is a center ring 35. The center ring 35 is also of T-shape cross section. The legs of the T-shaped body members 34 project radially inwardly with the heads forming a portion of the outer surface of the shell. The leg of the center ring extending radially outwardly with the end of the leg also forms part of the outer surface of the shell. The width of the inwardly extending legs 37 of the body members 34 when combined with the width of the head 38 of the center ring 35 is such as to leave four radially extending recesses or passages 39 within the housing (FIG. 7). These passages seat the legs of the seals 40.

Each of the seals 40 is annular, as best seen in FIG. 5, and is of U-shaped cross section with a pair of legs or sides 41 connected by a web 42. The legs project radially outwardly and seat in the passages 39. The outer ends of the legs have outwardly extending lips 43 designed to seat in the recesses formed by the axially projecting ribs 44 provided on the sides or axial surfaces of each of the end pieces 33 and 33a and on both surfaces of the head 38 of the center ring 35. Thus, the radially outer ends of the legs are securely clamped behind the ridges 44, positively holding the sides of the seals 40 against any radial movement except that which can occur by reason of flexing of the inner end portions of the legs of the seal beyond the ribs 44. This positively holds the seals against inadvertent release from their attachment to the shell. To further secure the anchor between the seals 40 and the shell, each of the ribs 44 has a small recessed channel 45 into which a portion of the seal is squeezed when the shells and seals are assembled.

Assembly of the seals and housing is accomplished by seating the seals 40 over the leg portion of each of the body members 34 then placing the assembled seal and rings in axial alignment with the center ring between them. The end members are then placed in position and bolts 50 (FIG. 3) installed through the assembled shell and tightened to squeeze the several components of the shell tightly together. This firmly and positively clamps the seals and locks them in place. The assembled shell is then secured to its stationary support plate 24 by means of bolts 51 (FIGS. 2 and 3).

The legs 37 of the body members are shorter than the depth of the recess within the seals 40. This creates between the seals and the inner radial end of the body members a chamber 52 into which fluid under pressure can be introduced through a port 53 from a suitable source. The ports 53 can be connected to any suitable source of pressurized fluid by means of conduits or tubing 54 (FIG. 1).

The seals can be molded or extruded and formed into an annulus by bonding the ends together. The seals are made of a resilient, oil resistant synthetic rubber material such as neoprene. The seals must remain flexible and must retain their memory even after many operating cycles. Even though air is the fluid, oil resistance is necessary because of lubricants normally used around machine tools.

When the chamber 52 behind one of the seals is at atmospheric pressure, the seal, by its natural resilience, is retracted into the position shown on the left-hand side of FIG. 3. As so retracted, there remains a small chamber 52 between the inner face of the seal and the inner end of the body member. The central portion of the web 42 is formed by an inwardly extending thickened band 54 extending laterally across a major portion of the center of the web. The band 54 stiffens the center portion of the web 42 whereby, when the chamber 52 is pressurized by the introduction of a fluid, the web which normally has a flat radially inner face is caused to shift radially inwardly with all or substantially all of the deflection occurring in the lateral or side portions of the web because those portions and the adjacent side walls are weaker. The result of this is that the band portions shifts radially inwardly to present a substantially flat face which seats against the ridges 31 on each side of the channels 30 and 30a. Because of this it forms sufficient bearing pressure against the ridges to form an effective seal against the leakage of fluid between the seal and the ridges. The width of the band 54 is substantially equal to the width between the lateral outer edges of the ridges 31 whereby a substantial area of the seal seats against each of the ridges 31.

Passing through the center of the band is a small opening 55. One or more of the openings 55 may be provided to permit the passage of pressurized air from the chamber 52 into the passages 32 and 32a. The size and number of the passages 55 collectively is significantly less than the flow capacity of the entry ports 53. Therefore, even though fluid is being admitted into the passages 32 and 32a, there will remain trapped in the chamber 52 sufficient air at sufficient pressure to assure the distension or deflection of the web 42 into sealing engagement with the ridges 31 whenever fluid is to be delivered to the passages 32 or 32a. As soon as the source of pressurized fluid is terminated, the seal 40, by its natural resilience and memory, retracts to its normal position spaced a 1/16 to an ⅛ of an inch from the tops of the ridges. When this has occurred, the chuck or other device which has been supplied with fluid can then be rotated without contact with the seals 40. Further, because there is a significant space maintained between the face of the seals and the tops of the ridges 31, when the seals are retracted, all danger of failure to effect complete disengagement between the seals and the tool body is eliminated, a problem which has not heretofore been solved.

The invention is useful with a wide range of tools or other devices in which the rotated element into which the fluid is to be introduced is intermittently rotated so that there are dwell periods when this invention can be utilized to charge the necessary fluid into the rotated portion. Since the shell and the seals are not a part of the rotated element, they have no effect upon the speed with which the element or chuck can be driven.

While the invention has been described as utilizing a pair of the channels and a pair of the seals in side-by-side relationship, it will be recognized that the invention can be used with a greater or lesser number of channels and seals if such is required by the complexity of the mechanisms to be charged and operated within the tool. It will also be recognized that the fluid can be either liquid or gaseous. However, in the vast majority of the uses to which this invention will probably be put, the fluid will be air since it is relatively simple to utilize and any fluid that escapes as a result of the opening of the seal after each cycle of operation will not result in a discharge that would cause the type of problem inherent in the use of a liquid such as oil.

Having described the preferred embodiment of the invention and some modifications which can be made, it will be recognized that other modifications of the invention can be made without departing from the principle of the invention. Such modifications are to be considered as included in the hereinafter appended claims unless these claims by their language expressly state otherwise.

I claim:

1. Means for intermittently delivering air under pressure to a rotatable chuck having an internal air operated mechanism, said chuck having at least a portion of its exterior surface formed as a smooth circular surface, said means characterized in that said surface has an air receiving channel, an annular stationary housing concentrically surrounding said surface, the inner surface of said housing having axially spaced recesses opening through the inner radial face thereof; a ring element between each of said recesses and forming the side walls thereof; said side walls having axially extending ridges intermediate the inner and outer radial ends thereof and forming circumferential axially recessed anchor pockets radially outwardly thereof; an annular seal of generally U-shaped cross section having radially outwardly extending parallel legs and a radially inwardly facing web seated in each of said recesses; said legs at their radial outer ends having circumferential axially extending lips, said lips each being seated in one of said anchor pockets for forcibly holding said legs against any radial movement other than as the result of flexing; said seal being of an elastic material having memory and said web of said seal member when retracted being generally flat and flush with the radially inner surface of said housing; the side walls of said recesses between said ridges and the inner radial face of said housing being axially spaced from the adjacent portions of the legs of said seals whereby said legs are free of frictional restriction against elongation and retraction and have freedom for limited axial flexure; means for positively locking the elements of said stationary housing in position concentric with said chuck; port means for introducing air under pressure into the interior of said seals for forcing the webs thereof to shift into sealing contact and form an air tight seal with said surface of said chuck on both sides of said channels; the centers of said webs being stiffened and the portions of said seals joining said central portions of said webs and said sides being more flexible than said centers of said webs whereby the webs as they move in response to air pressure substantially maintain their flat inner surface configuration; an opening through each of said webs aligned with said channels in said surface, said openings having an air flow capacity substantially less than that of said port means.

2. Means described in claim 1 wherein said stationary housing includes a pair of end rings and at least two annular body members of T-shaped cross section with the legs of the body members extending radially inwardly, the radially inwardly extending legs of each of said body members substantially filling the interior of one of said seals; a T-shaped ring element with the leg thereof extending radially outwardly and seated between the ends of the axially extending head portions of the body members and forming radially outwardly facing shoulders for seating the radially inwardly facing axially extending portions of said body members; means for compressing said end rings, annular body members and ring element together to clamp the lips of said seals in said anchor pockets.

* * * * *